United States Patent [19]
Ophardt et al.

[11] Patent Number: 5,551,552
[45] Date of Patent: Sep. 3, 1996

[54] MODULAR SHUTTLE CONVEYOR

[76] Inventors: Herman Ophardt, Lindenau 27, D-47661 Issum, Germany; Heiner Ophardt, 3931 Vineyard Cres., Vineland, Canada, L0R 2C0

[21] Appl. No.: 360,929

[22] Filed: Dec. 21, 1994

[51] Int. Cl.⁶ ............................................. B65G 25/00
[52] U.S. Cl. ........................................... 198/465.1
[58] Field of Search ................... 198/465.1, 465.2, 198/465.4, 803.01, 803.2, 465.3

[56] References Cited

U.S. PATENT DOCUMENTS

| | | | |
|---|---|---|---|
| 1,254,204 | 1/1918 | Connor. | |
| 1,900,903 | 3/1933 | Bennington. | |
| 2,280,984 | 4/1942 | Thurnau. | |
| 2,782,727 | 2/1957 | King | 104/172 |
| 3,598,060 | 8/1971 | Chitra | 104/168 |
| 3,609,295 | 9/1971 | Bielefeldt | 219/388 |
| 3,615,003 | 10/1971 | Rust | 198/177 |
| 3,854,419 | 12/1974 | Cocroft | 105/153 |
| 3,889,800 | 6/1975 | Frische | 198/179 |
| 4,067,293 | 1/1978 | Probst | 118/73 |
| 4,096,300 | 6/1978 | William et al. | 427/292 |
| 4,368,037 | 1/1983 | Limque et al. | 432/239 |
| 4,371,075 | 2/1983 | Erlichman | 198/465.3 X |
| 4,515,264 | 5/1985 | Sticht | 198/344 |
| 4,545,324 | 10/1985 | Browning | 118/634 |
| 4,590,884 | 5/1986 | Kreeger et al. | 118/308 |
| 4,619,205 | 10/1986 | Sticht | 104/168 |
| 4,840,124 | 6/1989 | Tadashima | 104/163 |
| 4,883,165 | 11/1989 | Neiman | 198/682 |
| 4,911,281 | 3/1990 | Jenkner | 198/370.03 X |
| 4,932,427 | 6/1990 | Yamada et al. | 134/66 |
| 5,103,964 | 4/1992 | Sticht | 198/465.2 |
| 5,205,026 | 4/1993 | Sticht | 198/346.1 |
| 5,213,195 | 5/1993 | Sticht | 198/465.2 |
| 5,271,139 | 12/1993 | Sticht | 29/430 |
| 5,271,490 | 12/1993 | Sticht | 198/349 |
| 5,372,241 | 12/1994 | Matsumoto | 198/465.4 |
| 5,388,684 | 2/1995 | Peck | 198/465.1 |

FOREIGN PATENT DOCUMENTS 693331  11/1930  France.

*Primary Examiner*—James R. Bidwell
*Attorney, Agent, or Firm*—Riches, McKenzie & Herbert

[57] ABSTRACT

The invention provides a conveyor for conveying items along a longitudinal track comprising: at least one shuttle beam engaged on said track for longitudinal movement therealong, each shuttle beam including a longitudinal rack with engagement teeth, and drive mechanisms spaced along the track for engaging and propelling each shuttle beam. Each drive mechanism comprises a pinion gear complementary to the rack for synchronized movement of the pinion gear and the rack by engagement between the engagement teeth of the rack and teeth of the pinion gear when the engagement teeth of the rack are disposed along a desired path relative the pinion gear and located on the path in phase with the teeth of the pinion gear. The rack has a flexible portion at at least one end of the rack capable of being deflected from a normal position to a deflected position in which the rack is displaced from the path away from the pinion gear when engaged by teeth of a pinion gear which are out of phase with teeth on the rack. This is advantageous to assist in preventing jamming of the rack and the pinion gear when the rack is simultaneously engaged by two pinion gears, as occurs when passing the rack from one pinion gear to the next pinion gear.

15 Claims, 9 Drawing Sheets

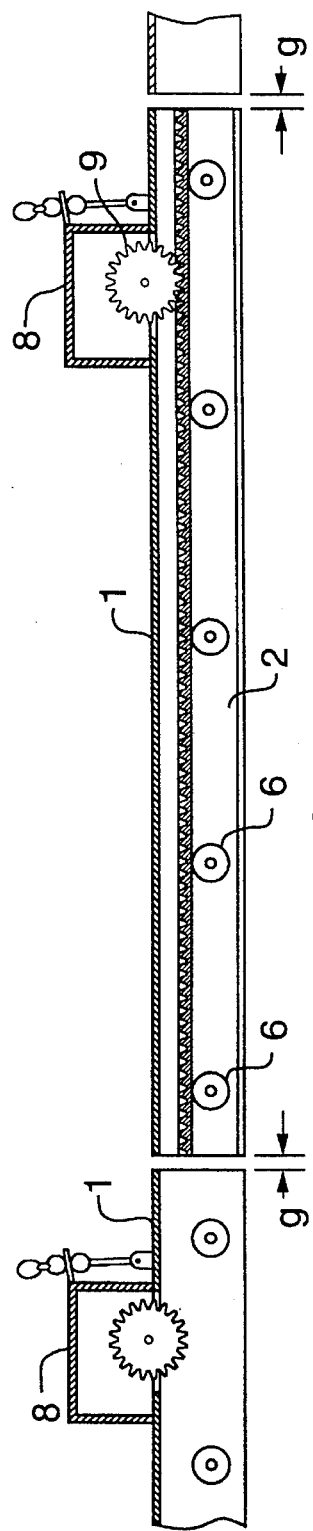
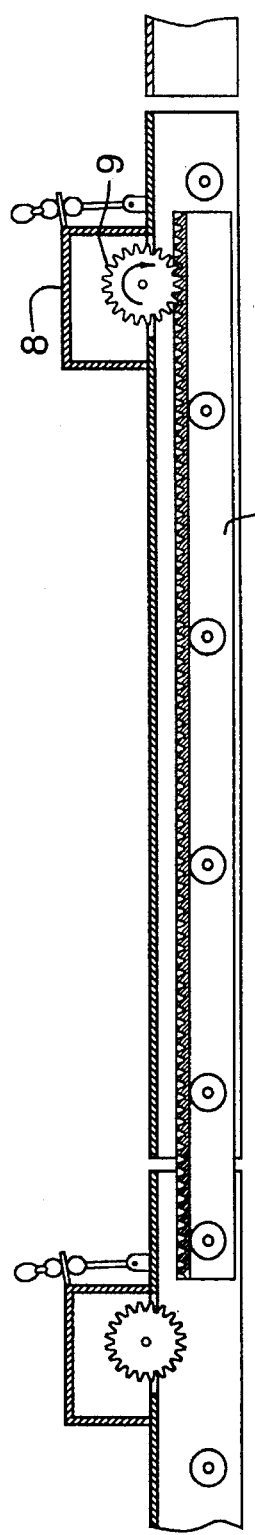
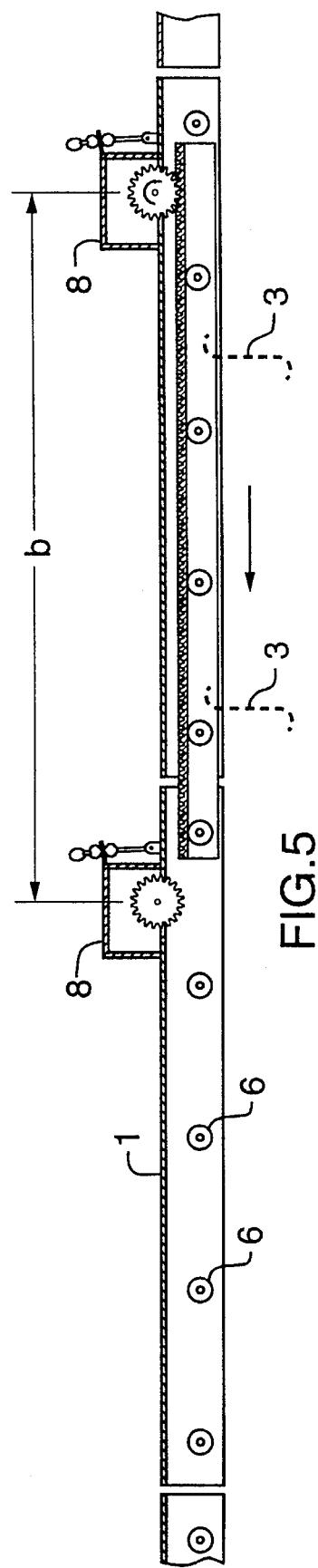
FIG.3
FIG.4
FIG.5

MODULAR SHUTTLE CONVEYOR

FIELD OF THE INVENTION

The invention relates to a computer controlled conveyor having a series of drive units spaced along a track to drive shuttle beams bearing conveyed items on the track.

BACKGROUND OF THE INVENTION

The invention provides a novel solution to the problems posed by conventional conveyor systems such as continuous belts or chains used in the conveying of various items during manufacturing procedures.

The use of continuous chain or belt drives suffers from a fundamental disadvantage in that all procedures or operations which are undertaken to items conveyed must be done simultaneously. A clutch system is often used to remove items from a continuously moving conveyor, however, items are jolted when re-engaged or disengaged from the conveyor. If the belt breaks or if an operation is shut down for any reason, in general, the entire belt must be stopped and all operations along its length are curtailed until operation is resumed.

For example, a common application of a continuous chain conveyor is in the preparation, painting and drying of sheet metal parts. An overhead chain is often used which has hooks suspending below the chain on which sheet metal parts are hung. Once the items have been manually hung up on a hook of the chain, while the chain is moving, the parts may be dipped in a degreasing compound, then dried, passed through a spray painting booth where they are coated, passed through a drying oven and thereafter removed from the hooks and packed or forwarded for further assembly.

The disadvantage of using conventional chain conveyors is that the timing of all manufacturing steps along the processes are determined by the speed of the chain. For example, if one wished to use a slow drying paint which required a longer residence time in an oven, the chain speed must be reduced or the length of the oven extended in order to extend the drying time. Likewise if any step in the procedure, such as hanging parts manually, becomes the determining factor, the only way to speed up production is to put more workers on the slowest operation.

Optimization of a single particular operation is often not possible without a complete optimization of the entire manufacturing procedure.

Therefore although the mechanics of a continuous chain drive conveyor system are relatively straight forward, the design and modification of manufacturing procedures along such a continuous conveyor are severely disadvantaged by requiring all operations to be determined by the speed of the chain. It is generally not possible to stop one portion of the operation without stopping the entire conveyor system. Likewise it is difficult to increase or reduce speed of a particular operation without affecting all other operations along the continuous conveyor.

Maintenance of a continuous conveyor is also at a disadvantage since if one portion of the conveyor system malfunctions the entire system often must be shut down.

Chain drive continuous conveyors often include means to connect or disconnect a item to be conveyed from the chain. For example a lever may be strung to maintain an item in a stationary position as the chain slides through a sleeve or a clutch. However when one wishes to recommence movement of the conveyed item, the items are jolted or jerked together. Such jolting may cause a safety hazard to operating personnel and may cause the conveyed items suspended from the chain to impact against each other. Such impacts may chip paint and produce undesirable dents or other damage.

A further disadvantage of using chain drive conveyor systems through drying ovens is that it is essentially impossible to seal the oven when moving parts must be constantly inserted and withdrawn from the oven on a moving chain drive. A common configuration simply leaves the entrance and exit doors open resulting in excessive fuel consumption. In order to save fuel it is possible to remove items from the chain and insert them into a closed oven however the extra handling involved in such an operation does not counterbalance the savings in fuel expense generally.

In particular such conveyor systems supplied to painting operations raise further disadvantages. When electrostatic coating systems are used it is essential that the chain be grounded at all times despite the fact that it is moving. Since the chain must be adequately lubricated as well, a fundamental disadvantage is presented since proper lubrication and maintenance of a good ground to ensure high quality electrostatic coating are incompatible.

Electrostatic powder coating is becoming the norm for coating technologies since no solvents are required and oversprayed powder may be recycled thereby saving expense and substantially eliminating pollution problems.

Electrostatic powder coating booths are relatively expensive and in order to change colours or other paint characteristics it is necessary to meticulously clean the booth to avoid contamination between different paint types. The cost of powder paint booths therefore is relatively high since they must be specifically designed to be easily cleaned and to withstand several cleanings. It is common to construct powder paint booths out of stainless steel for these reasons. For example it is not unusual for the change over from one paint colour to another to involve a one half a day of cleaning of the paint booth before the change over can be completed.

It will be apparent therefore that relatively long runs of a particular colour paint are desirable to maximize production efficiency. The change over of colours or other paint types to accommodate short runs is impractical because of the time and cost involved in cleaning the paint booths every time a paint type must be changed.

SUMMARY OF THE INVENTION

In one aspect, the invention overcomes the disadvantages of the prior art in a novel manner in the provision of a conveyor for conveying items along a selected path, said conveyor comprising: a longitudinal track; at least one shuttle beam engaged upon said track for longitudinal movement thereon, the shuttle beam including attachment means for releasably attaching conveyed items to each beam, the shuttle beam having a length equal to a first dimension; bearing means, coacting with said track and each shuttle beam, for aligning each beam on the track and for reducing friction therebetween; a plurality of drive units longitudinally spaced apart a second dimension along said track, each drive unit including drive means for engaging and propelling each passing shuttle beam, said second dimension being less than or equal to said first dimension whereby each shuttle beam remains in engagement with at least one drive unit. Preferably, programmable control means, communicating with each drive unit are provided for selectively controlling operation of each drive unit and for determining each shuttle beam's position relative to a control datum. Such a conveyor can be applied to an electrostatic powder coating facility in order to convey items to be painted through loading stations, paint booths, drying ovens, assembly stations, etc. Changing of paint types such as colours, composition etc. can be easily accomplished through use of changeable modular paint booths dedicated to a single paint type and conveyed on the same conveyor system.

In another aspect, the invention overcomes disadvantages of prior art by providing in the context of a rack and pinion system to drive a shuttle beam along a track, a novel rack arrangement having a flexible rack portion at at least one end of the rack capable of being deflected when engaged by teeth of the pinion gear to assist in preventing jamming of the rack and the pinion gear when they are not in phase.

In this aspect, the invention provides a conveyor for conveying items along a longitudinal track comprising: at least one shuttle beam engaged on said track for longitudinal movement therealong, each shuttle beam including a longitudinal rack with engagement teeth, and drive mechanisms spaced along the track for engaging and propelling each shuttle beam. Each drive mechanism comprises a pinion gear complementary to the rack for synchronized movement of the pinion gear and the rack by engagement between the engagement teeth of the rack and teeth of the pinion gear when the engagement teeth of the rack are disposed along a desired path relative the pinion gear and located on the path in phase with the teeth of the pinion gear. The rack has a flexible portion at at least one end of the rack capable of being deflected from a normal position to a deflected position in which the rack is displaced from the path away from the pinion gear when engaged by teeth of the pinion gear to assist in preventing jamming of the rack and the pinion gear when the teeth of the pinion gear and the teeth of the rack are not in phase along the path.

Further aspects of the invention will become apparent upon review of the following detailed description.

BRIEF DESCRIPTION OF THE DRAWINGS

In order that the invention may be readily understood, a preferred embodiment of the invention will be described by way of example with reference to the accompanying drawings in which:

FIGS. 3, 4 and 5 are broken away longitudinal elevation views showing the progression of a shuttle beam from right to left as driven by a rack and pinion drive means;

DETAILED DESCRIPTION OF PREFERRED EMBODIMENTS OF THE INVENTION

Although the invention is described in association with a preferred embodiment applied to a painting and drying facility, it will be understood that the conveyor system may be used for any type of manufacturing or material handling. In particular the conveyor system illustrated shows an overhead hanging system however it will understood that the tracks may be laid upon a floor or along walls if desired.

Figure 1:
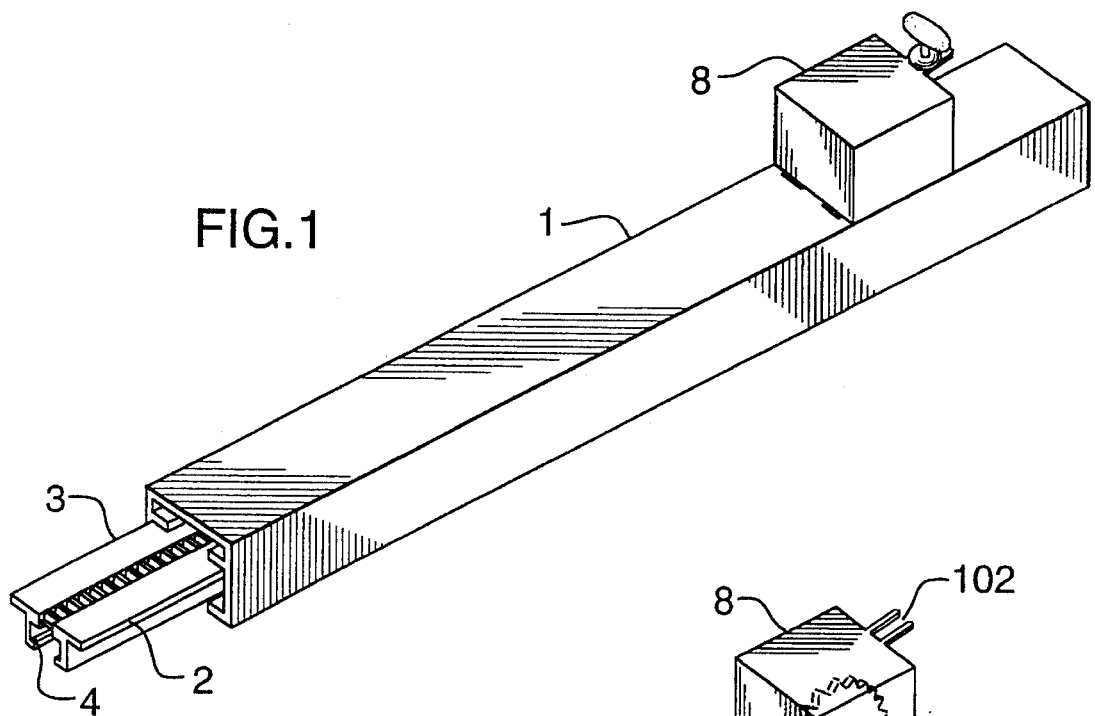
FIG. 1 is a perspective view of a single track module with a shuttle beam engaged therein.
Figure 2:
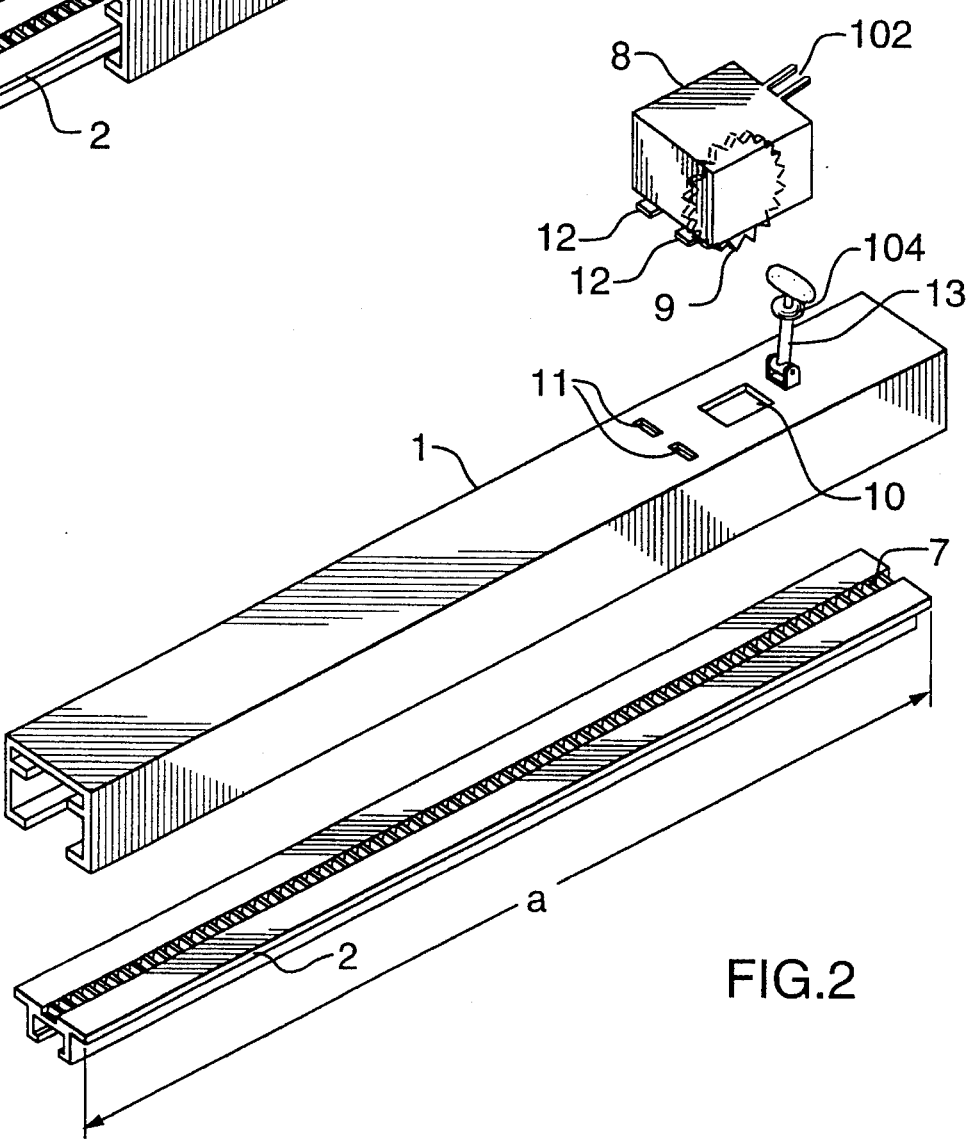
FIG. 2 is an exploded view of the module and beam of FIG. 1.
Figure 6:
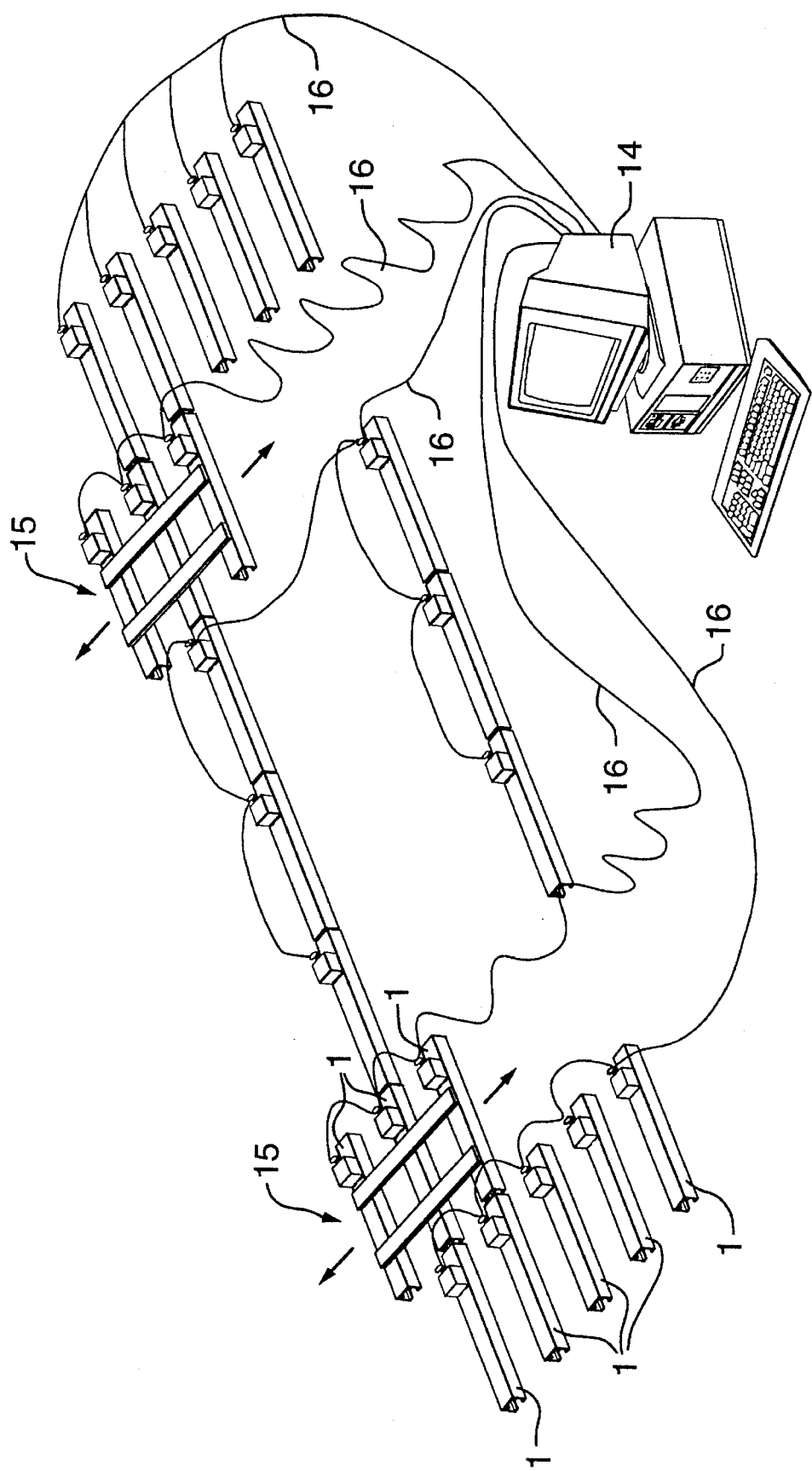
FIG. 6 is an overhead perspective view of a conveyor system showing parallel rows of track modules with two transverse transfer cranes to transfer beams between parallel rows of modules.
Figure 7:
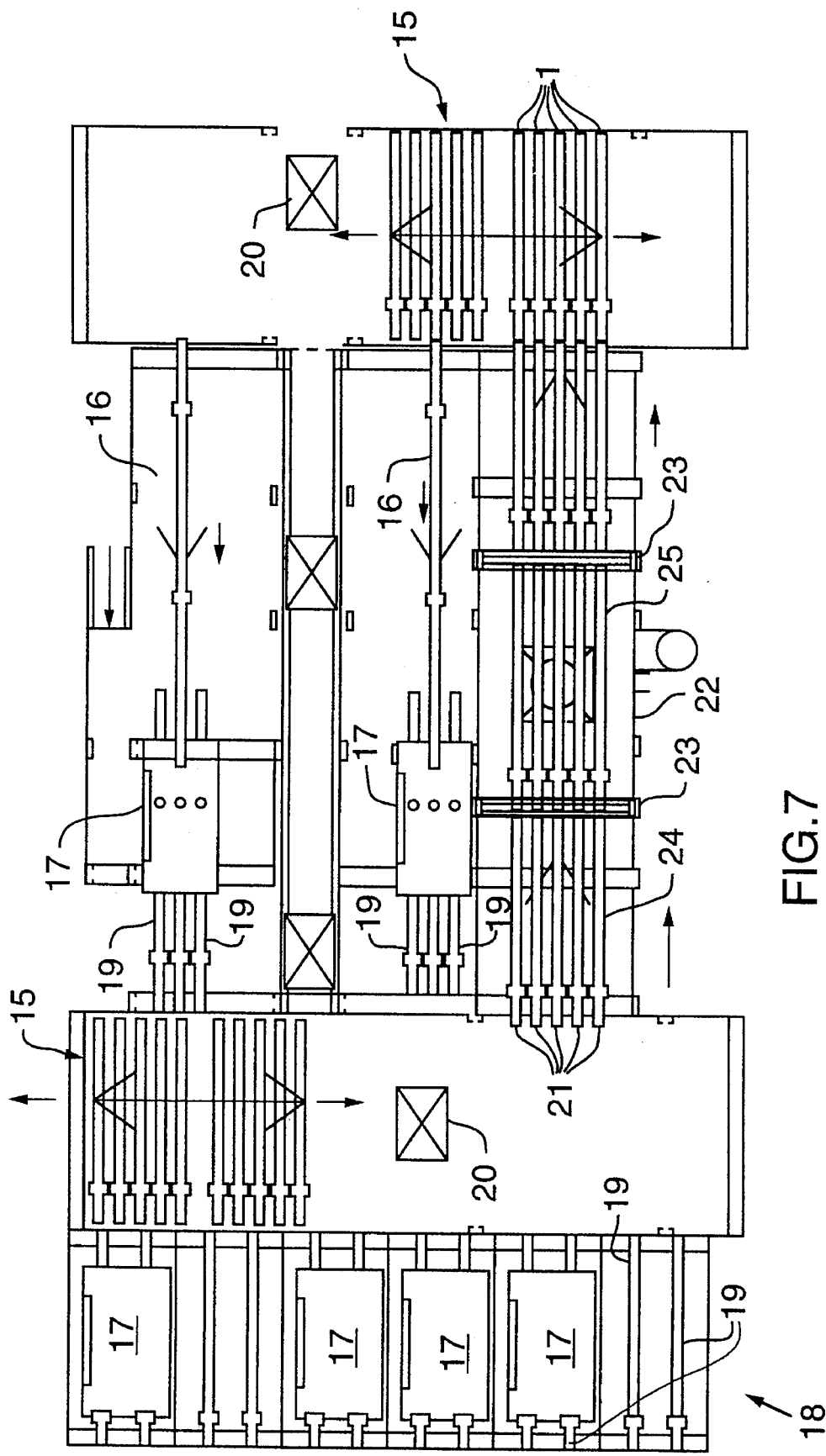
FIG. 7 shows a further refinement of the system shown in FIG. 6 applied to an electrostatic powder painting facility, with interchangeable paint booths, drying oven and two transfer cranes.

FIGS. 1 and 2 illustrate a single track module of which a longitudinal track may be constructed by laying such modules in end to end longitudinal alignment. The modules may be easily assembled and disassembled into any desired pattern as shown in the examples of FIGS. 6, and 7.

In essence, the conveyor serves to pass a shuttle beam between drive units mounted on the track, reminiscent of the passing of a baton in the running of a relay race. The shuttle beam carries the items to be conveyed, and at all times the shuttle beam may be engaged with at least one drive unit.

Since the modules can be aligned with a gap between track modules, modules which are initially aligned end to end may be moved apart or objects such as doors may be inserted in the gap. Although this feature initially appears simple, very significant advantages result. For example, different areas of the conveyor may be completely sealed off from other areas, through use of doors operating in the gap. Completely sealed drying ovens, pressure vessels, weatherproof doors, etc. may be used whereas with conventional continuous conveyors these features are unattainable. Further, the gap enables different parts of the conveyor to be moved relative to each other, such as when transfer cranes and magazines or rotary turntables are used to support parts of the track. As a result, shuttle beams may be transferred between parallel tracks or redirected angularly between tracks much like locomotives on a turntable.

Figure 9:
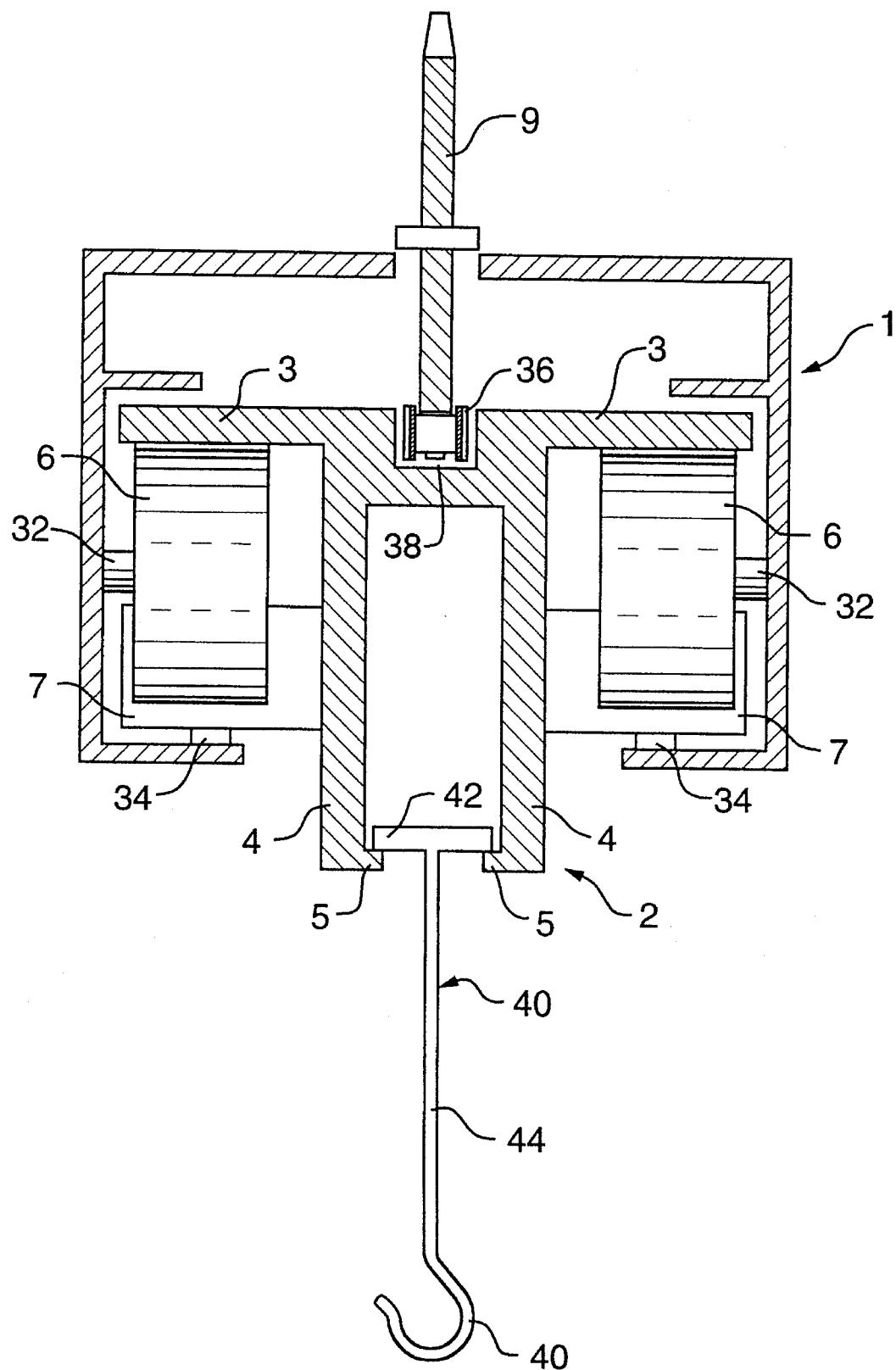
FIG. 9 is a schematic cross-sectional end view of FIG. 1 showing the relative location of the module and beam and a pinion.

Turning first to the individual track modules and shuttle beams, in the preferred embodiment illustrated in FIGS. 1, 2 and 9, the track module comprises a C-shaped channel track 1. The shuttle beams 2 are T-shaped sections having flanges 3 which mate internally with the channel track 1.

Webs 4 of the T-shaped shuttle beam 2 extend outwardly of the channel track 1 from a mid-portion of the flanges 3. Items to be conveyed by the shuttle beam are hung from the webs 4 upon hangers such as wire hooks or other hangers for example shown in FIGS. 9, 10 and 11. In the preferred embodiment, as seen in FIG. 9, webs 4 have inwardly directed shoulder forming portions 5 to engage an enlarged end 42 of a hanger rod 40 having an elongated section 44 ending in an article supporting hook 46.

A shuttle beam 2 is engaged upon the channel track 1 for longitudinal movement within the C-shaped channel track 1. In the embodiment as illustrated in FIGS. 3 through 5 and FIG. 9 the beam 2 includes wheel-like roller bearings 6 mounted to the channel track 1 for rotation about a horizontal axis 32 so as to engage the undersides of the flanges 3 and support each shuttle beam 2 on the channel track 1 bearing the weight load. In addition to roller bearings 6, additional wheel-like bearings illustrated only in FIG. 9 as 7 are provided mounted to the channel track 1 for rotation about a vertical axis 34 on each side of the channel track so as to engage the vertical outer surfaces of webs 4 and guide the shuttle beam 2 side-to-side through the channel track 1.

The roller bearings 6 and 7 serve to align the beam 2 on the track. Spacing of the roller bearings 6 and 7 is such that at least 2 pairs of each roller bearings are always in contact with the shuttle beam. In the preferred embodiment no roller bearings are provided on the shuttle beam 2 which can be simply formed as from an extrusion.

The absence of roller bearings on the shuttle beam 2 enable the entire shuttle beam 2 and articles suspended thereon to be dipped or otherwise treated in corrosive chemicals without damaging lubricated bearings or plastic rollers. A further advantage of placing the rollers 6 and 7 on the track 1 is where shuttle beams 2 are conveyed through an oven. In an oven application, rollers 6 and 7 within the oven remain hot whereas rollers 6 and 7 outside the oven remain substantially at the same temperature. As a result, damaging cycles of heating and cooling, expansion and contraction are not experienced by the rollers 6 and 7. It will be understood however that the scope of the invention includes embodiments wherein the rollers 6 and 7 are secured to the shuttle beam 2 and not on the track 1.

As shown in FIGS. 2, 9, 10 and 11, each shuttle beam 2 includes a longitudinal toothed rack 7. Preferably the rack may comprise a length of link chain 36 similar to that used with a bicycle, and secured as by horizontal locating pins 37 in a closely sized U-shaped channel 38 in shuttle beam 2.

Figure 10:
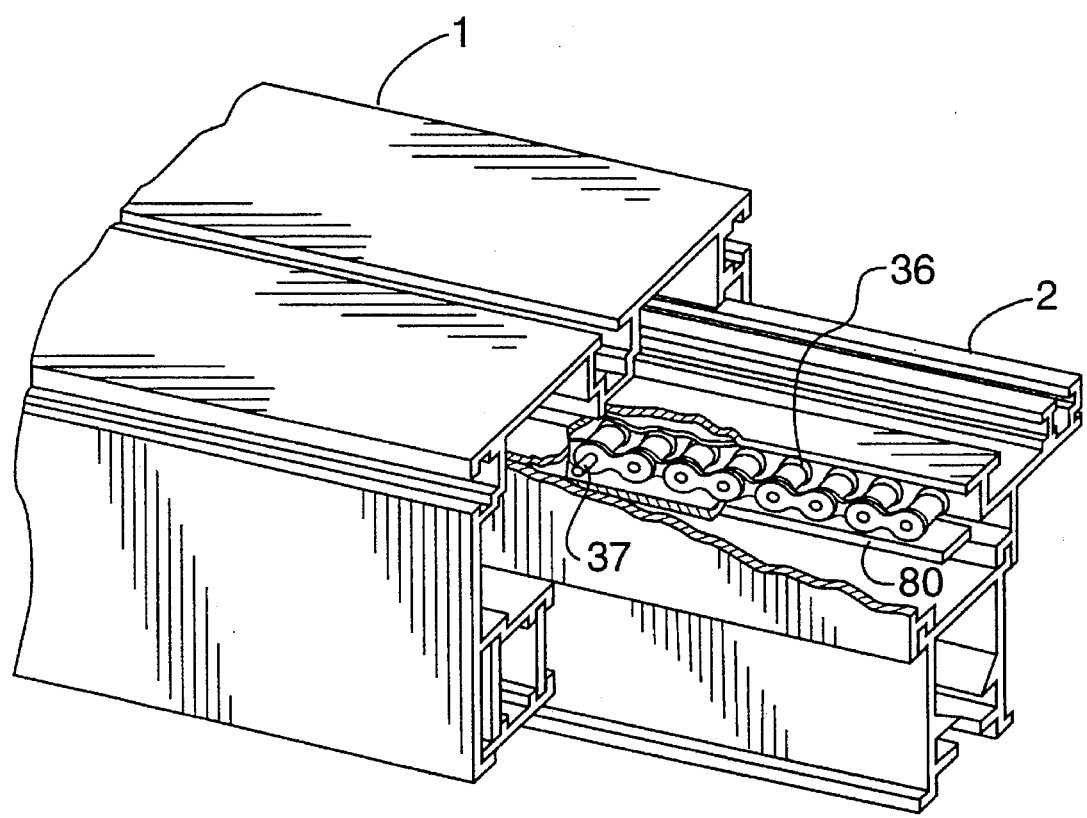
FIG. 10 is a partially broken away isometric view of a track module with shuttle beam partially extending therefrom showing the central spring loaded chain rack member.
Figure 11:
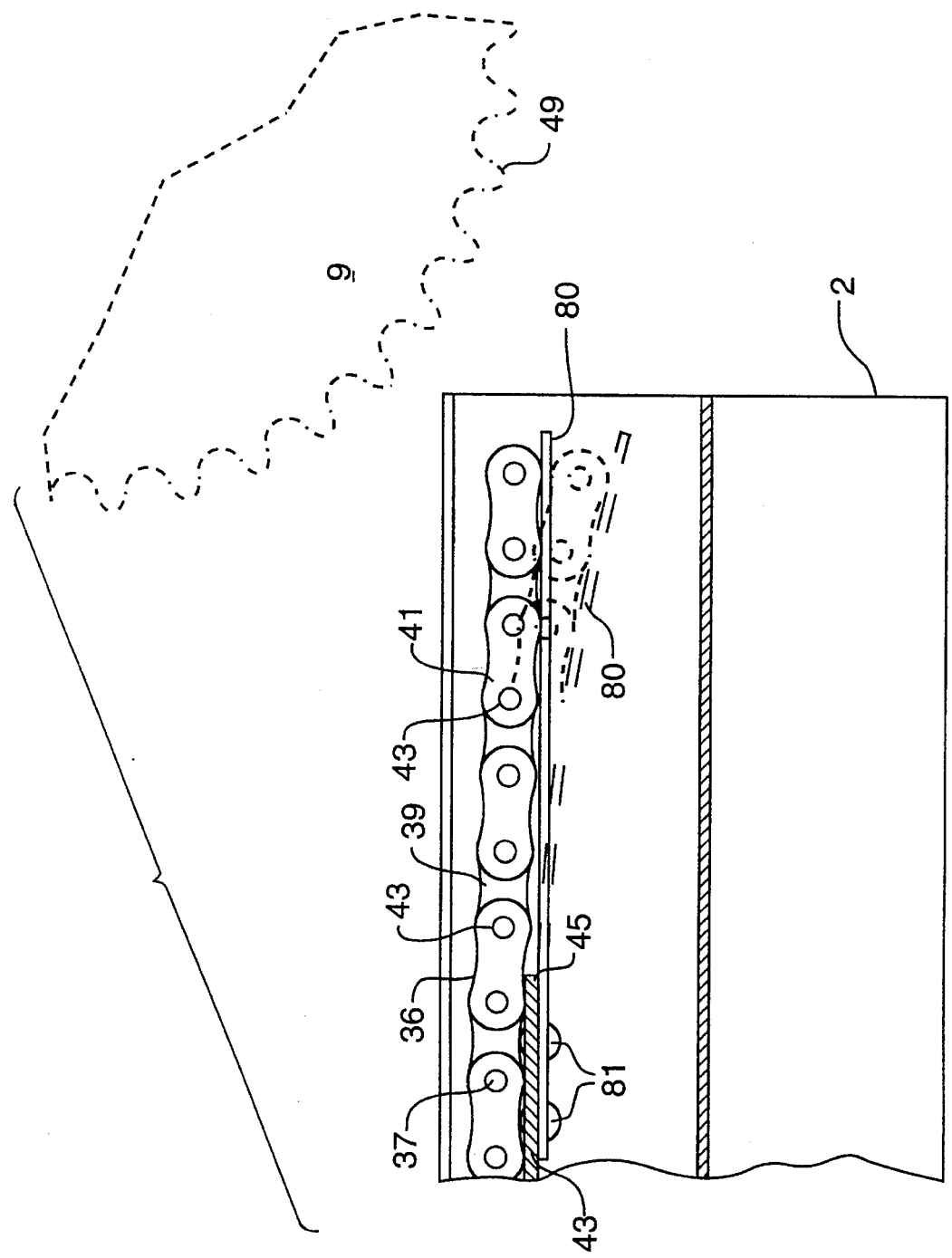
FIG. 11 is a sectional elevation view along line 11—11 of FIG. 10.

As best seen in FIGS. 10 and 11, the link chain 36 comprises a plurality of overlapping links 39 and 41 pivotally joined by hinge pins 43. To secure the link chain 36 in the U-shaped channel 38, at two locations, the hinge pins 43 are replaced by longer locating pins 37 which passes through the links 39 and 41 and into the side walls of the channel 38. Preferably at least two such locating pins are provided, one near each end of the chain 36.

With reference to FIG. 9 it will be apparent that the toothed pinion wheel 9 engages the chain 36 while it is confined within the closely sized U shaped channel 38. The chain 36 need only be connected to the channel 38 as via a locating pin 37 at a single point in the rear of the beam 2 in order to secure it for driving together with the beam 2, however preferably at least two locating pins 37 are provided.

As shown in detail in FIGS. 10 and 11 a particular advantageous feature is the spring loading of one, and more preferably both, ends of the chain 36. A leaf spring 80, such as a strip of spring steel, is securely anchored at its inward end to the beam 2 with rivets 81, for example. As best shown in FIG. 11, the chain 36 has outermost links which merely drape over the leaf spring 80. In the event that the teeth 49 of a pinion 9 are not precisely aligned to engage with the receiving hinge pins 43 of the chain 36, the leaf spring 80 may deflect downwardly to permit the teeth 49 and chain 36 to better engage and to assist in preventing jamming. The leaf spring 80 acts much in the way of a diving board being a cantilevered flexible member. As is to be appreciated and as shown in FIGS. 10 and 11, the floor of the U-shaped channel is cutaway so that the channel floor 43 ends at 45 and the spring 80 may deflect downwardly to the position shown in FIG. 11 in dotted lines. The chain 36 draped over the flexing leaf spring 80 is not secured other than by locating pin 37 so that at the outward end of the beam 2 the spring merely drapes over the leaf spring 80 and is capable of sliding slightly on the upper surface of the leaf spring when the leaf flexes downwardly. By this simple arrangement therefore the accurate engagement of the fixed axle pinion 9 and the chain 36 is ensured in an inexpensive and easily constructed manner. If some degree of freedom was not provided between the pinion 9 and beam 2, inaccurate positioning of the pinion teeth and chain 36 could result in jamming and stalling of the pinion 9 and beam 2. For example, as seen in FIG. 5 each shuttle beam 5 is of a length, and successive pinions 9 associated with adjacent track modules are spaced such that each shuttle beam 2 is always in engagement with at least one pinion. In a shuttle beam 5 passing between successive track modules, at least momentarily two pinions 9 will be engaging the same shuttle beam. This presents the possible difficulty that if the chain of the shuttle beam were inflexible and the teeth of the pinion 9 to next engage the chain were to be sufficiently out of phase with the links of the chain as to directly contact on top of a hinge pin 43, that a jamming condition could arise, particularly while the teeth of the first pinion remain in engagement with the chain. Thus, it is to be appreciated that in normal engagement between a first pinion gear and the chain, the links of the chain are disposed along a desired path relative the pinion gear with the links of the chain in phase With the teeth of the first pinion gear. If the links of the chain are not in phase with the teeth of a second pinion gear, to be engaged by the chain while the first pinion gear is engaged, the flexible end portion of the chain can deflect so as to prevent jamming. Once the first pinion gear is disengaged, the shuttle beam may move longitudinally relative the second pinion gear to have the chain become in phase with the second pinion gear.

The flexible end portion of the chain should extend inwardly from one or both ends of the chain sufficiently so that whenever two pinion gears simultaneously engage the chain, at least one of the pinion gear engages flexible portion. If there are flexible portions of the chain at both ends and a non-flexible central portion of the chain, preferably neither pinion gear engages the central portion when another pinion gear is engaging the chain anywhere. In certain arrangements, the stalling of a single beam could disable the entire conveyor system until the pinion 9 or beam 2 is moved longitudinally slightly to properly engage the pinion teeth and chain 36. The slight movement of the chain 36 draped on the flexible leaf spring 80 therefore relieves any forces which would tend to jam or stall the beam when inaccurate positioning of pinion teeth and chain 36 occurs. The slight flexing of the chain allows the slippage of the chain 36 and teeth to a degree sufficient to avoid jamming and to enable accurate placement. The spring loading of at least one end, and preferably of both ends, of the chain 36 therefore provides a smooth transition when engaging and disengaging adjacent pinions 9 as the shuttle 2 travels along the length of the track 1.

The feature of the rack having a deflectable, flexible portion at one end has been illustrated with reference to the preferred use of a chain 36 and a leaf spring 80. It is to be understood that many other mechanical arrangements would provide for a flexible, preferable articulating end to a rack.

A drive unit 8 includes a drive motor which engages a mating pinion 9 which coacts with the rack 7 to drive the shuttle beams 2. It will be apparent that the pinion 9 may drive the beam 2 forwardly or rearwardly at variable speed. Other drive means may be used to equal advantage such as a rotating rubber drive wheel in applications where the precise movement of the shuttle beams is not critical.

The simplicity and modular construction of the conveyor components makes the conveyor extremely adaptable, easily maintained and of relatively low cost in comparison to conventional conveyors. The motor preferably comprises an electric motor preferably of low voltage. For example in the application of the conveyor to painting relatively light weight sheet metal components it has been found by experimentation that use of a 24 volt direct current automotive windshield wiper motor as a drive motor for the drive unit 8 results in a very reliable easily replaced modular drive unit 8.

As shown in FIG. 2, the pinion 9 extends through an opening 10 in an outer wall of the track channel 1. The drive unit 8 may be simply attached in position through use of mating slots 11 and tabs 12. An elastic securing belt 13, of the type commonly used to secure truck hoods, may be used to advantage with a U-shaped slot 102 on the drive unit received under an enlarged node 104 on the stretched belt 13. If a drive unit 8 is determined to be malfunctioning, no special tools are required to remove it and simple replace it with another modular drive unit 8. A malfunctioning drive unit 8 may be quickly removed and replaced without tools. The drive unit 8 may also be lifted to a non-engaged position out of engagement with beams 2 and in which the beams 2 to be slid along the track 1 manually. For example, the drive unit may be pivoted about tabs 12 and the slot 102 placed above node 104 on the belt 13 to hold the drive unit in a non engaged position. Advantageously, power and control cables may be attached to the drive unit with easily removable jacks.

The ability to simply disengage the pinion 9 and beam 2 and slide the beams 2 manually adds significant flexibility to maintenance and offers a low cost mode of operation in emergencies or as a design choice for particular applications.

The track modules 1 and shuttle beams 2 may be constructed of anodized aluminum extrusions cut to standard modular lengths, such as 3 meters or 10 feet. It will be apparent that in order for each shuttle beam 2 to remain in engagement with at least one drive unit 8 as is preferred, the length of the shuttle beam "a" is directly related to the spacing "b" of drive units longitudinally along the track. In particular the spacing between drive units (as shown in FIG. 5 as "b") preferably is less than or equal to the length of the beam 2 "a".

FIGS. 3, 4 and 5 illustrate the means by which the shuttle beams 2 are preferably moved longitudinally along the track 1 effectively by passing the beam 2 between a series of drive units longitudinally spaced along the track 1. The length of the beams 2 are shown greater than or equal to the spacing between the pinions 9 of the drive units 8. As a result the beams are passed from one drive unit 8 to the other in a sequential relay manner.

In FIG. 3 a beam 2 is shown positioned within a track module 1 engaged on the stationary pinion 9 of a drive unit 8. The track modules 1 are disposed in end to end longitudinal alignment and advantageously may be positioned to have a gap "g" between the ends of adjacent track modules 1. This gap enables a malfunctioning or damaged track module 1 to be easily removed and replaced. As well the gap "g" has significant advantage in enabling doors to be positioned between track modules 1 and to allow track modules to be shifted relative to each other as will be explained in greater detail below.

FIG. 4 illustrates the position of the beam 2 when the pinion 9 is activated to rotate in a clockwise manner. The beam 2 rolls freely upon the roller bearings 6 towards the left as drawn between adjacent longitudinally aligned track modules 1.

With reference to FIG. 5, as the pinion 9 moves the beam 2 towards an adjacent drive unit 8 the relationship between the length "a" of the beam 2 and spacing of drive units "b" becomes apparent.

It will also be apparent that precise control means are preferably provided to ensure that the teeth of the rack 7 and the pinions 9 of successive drive units 8 engage precisely at the correct speed in order to avoid damage between the racks 7 and pinions 9. To this end the invention includes programmable control means such as the central processing unit of a computer, which communicates with each drive unit 8 and selectively controls the operation of each drive unit 8. A significant degree of flexibility in positioning and a smooth "jerkless" engagement and disengagement is provided by the spring loading of one or both ends of the chain rack 36 with a cantilevered leaf spring 80.

As also will be apparent from the illustration of FIG. 5, the programmable control means may also serve the function of determining the position of each shuttle beams 2 relative to some fixed control datum. The drive units 8 may be controlled to engage and propel each passing shuttle beam 2. The precise location and speed of travel of each shuttle beam 2 may be strictly monitored and the operation of various drive units 8 along the length of the track 1 may be closely controlled.

Computers are ideally suited for just such an application. The use of 24 volt DC drive motors reduces shock hazards, and cost of wiring, enables simple monitoring and variable speed operation of the drive motors. Computer programs may easily developed to commence movement of the shuttle beam 2 at a relatively slow rate and thereafter accelerate or decelerate as required. As result the jerking or jolting associated with conventional continuous chain drive conveyors may be avoided.

The modular construction of the track 1 allows easy addition or modification of conveyor systems. Maintenance is drastically simplified since one need only identify which component is malfunctioning and replace it with an identical unit from a stock of spare parts. Downtime of the conveyor system is therefore minimized through use of modular components.

Use of extruded aluminum beams 2 and track 1 with mass produced drive units 8 significantly reduces the cost of a conveyor system both in initial capital cost and maintenance. The computerized control of a series of drive units 8 is a relatively simple programming exercise which can be run on a standard personal computer.

FIG. 6 illustrates a schematic view of a series of track modules 1 arranged in parallel rows and all controlled by a central personal computer 14. The particular arrangement shown includes five parallel rows of track modules 1. All modules 1 are connected to the personal computer 14 which co-ordinates all operations. A bank of three modules 1 are each attached to two transfer cranes 15 which move transverse to the longitudinal axis of the track 1.

In this manner shuttle beams 2, and the conveyed items attached to them, may be transferred transversely between parallel rows of track modules 1. It will also be apparent that, in place of the transfer cranes 15, a rotary turn table may also be used to transfer beams 2 between transverse or angular oriented rows of track modules 1.

As shown in schematic view FIG. 6, the control means includes a central processing unit (CPU) within the computer 14 which communicates with each drive motor via cables 16. The CPU selectively transmits a variable speed drive signal to each drive motor according to the preprogrammed routing for a shuttle beam 2. Any acceleration, deceleration, forward, reverse or stop signal may be transmitted as a drive signal to the drive unit 8.

The control means also include proximity sensors associated with each drive unit 8 in order to detect an approaching shuttle beam 2 and to transmit a proximity signal to the CPU. Advantageously the operation of the series of drive motors may be co-ordinated with such proximity sensors to avoid damage. In addition, rotary encoders may be used coacting with each drive wheel 9 or pinion 9 to determine the rotational position and rotational speed of an associated drive wheel 9 or pinion 9 relative to a radial datum. The rotary encoders transmit an encoder signal to the CPU in order to control the speed of rotation and the rotational position of any pinion or drive wheel 9.

In this manner the control means housed within the personal computer 14 may be used to pass a shuttle beam 2 along the series of drive motors in a controlled manner. The CPU also controls as illustrated in FIG. 6 the transverse operation of the transfer cranes 15.

As stated above the track modules 1 are longitudinally spaced apart by a gap "g" between each track module 1. The gap "g" between the modules 1 supported on the transfer cranes 15 and adjacent stationary modules 1, attached to the roof of a plant building for example, ensures that the crane 15 may be moved. To equal advantage a rotary turn table may be operated only if a gap exists between adjacent track modules. To reduce the size of gap in a rotary application, the adjacent ends of track modules may be cut in a circular profile.

Figure 8:
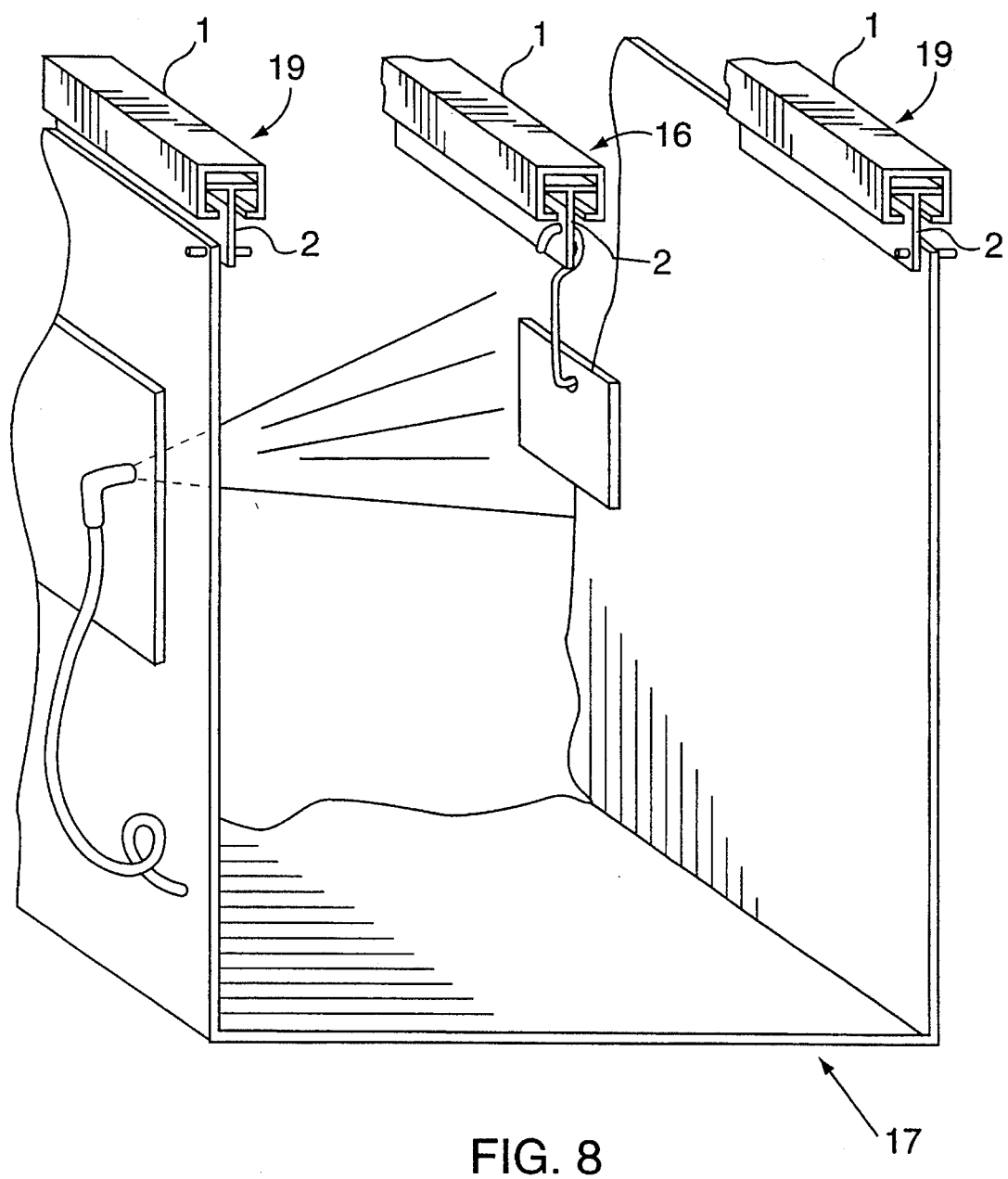
FIG. 8 shows a schematic cutaway view of a modular paint booth which is suspended from two like tracks with a central track used to convey items to be painted.

A preferred embodiment of the invention is illustrated in FIG. 7 as applied to an electrostatic painting facility. Transfer cranes 15 in this illustration include ten track modules 1 each. Two parallel painting conveyors 16 are shown each also constructed of modular track components 1. Modular electrostatic powder paint booths 17 are positioned centrally on the painting conveyor 16. As illustrated in FIG. 8 the paint booths 17 themselves are supported on two outer tracks 19 parallel to and spaced apart from the central track 16.

The use of three parallel tracks (16, 19, 19) therefore allows the paint booth 17 to be conveyed between the fixed paint station, as illustrated in the centre of FIG. 7, and a storage station 18 on the two outer tracks 19. The storage station 18 provides a type of "parking lot" for each of five modular paint booths 17.

Therefore the two outer tracks 19 are used to convey the paint booths 17 to the fixed paint station and may interchange the booths 17 with the assistance of the transfer crane 15 between the fixed paint station and the storage station 18.

Considerable advantage may be secured when such replaceable modular paint booths 17 are used in powder coating procedures.

As mentioned above in respect of conventional paint booths, contamination of one type of paint with the other is unacceptable in powder coating facilities. Conventional paint booths must be thoroughly cleaned before a different type of paint may be used.

In the invention as illustrated in FIG. 7 each paint booth 17 may be dedicated to a specific paint type or colour. Therefore cleaning of the booths 17 is not necessary. If a facility is set up to use five different types of paint. For example, small runs of different types may easily accommodated by merely exchanging the modular paint booths 17.

Of course if more than five types of paint are to be used, additional paint booths 17 may be purchased or alternatively the paint booths 17 may be cleaned while in the storage station 18 in a manner which does not affect the painting operation.

The fixed paint station may include air compressors for spray paint guns, and vacuum machinery as conventional. The modular paint booths 17 may be constructed to merely plug into and out of stationary vacuum and air supplies and thus avoid the need for each paint booth to have these items. The modular paint booths 17 include their own supply of paint and a dedicated powder gun and therefore no components require cleaning since they are dedicated to the one paint type for the particular modular paint booth 17.

Therefore with reference to FIG. 7 a painting procedure may be carried out as follows, utilizing the distinct advantages of the conveyor system and modular paint booths 17 described above.

Referring to the transfer crane 15 at the right of FIG. 7, items to be painted may be unloaded from pallets 20 and stored upon shuttle beams 2 housed within the 10 track modules 1 suspended from the transfer crane 15. The transfer crane 15 may be automatically operated after loading to transfer the loaded shuttle beams 2 along the paint conveyor 16 through the paint booth 17.

The painted items thereafter may be loaded on the second transfer crane 15, to the left of FIG. 7. If the type of paint is such that it may be dried without placing in an oven, the finished painted items may be removed and placed upon skids 20 for further assembly under the second transfer crane 15.

If the items require oven curing the beams 2 may be transferred from transfer crane 15 through five parallel conveyors 21 into an oven 22.

A particular advantage of the present conveyor system is that there is a gap between conveyor modules 1. As shown in FIG. 7, the oven 22 has insulated doors 23 on both ends which are operable between an open and closed position within the gap. As a result the five tracks may be isolated between a first input portion 24 and a second track portion 25 which is housed within the closable oven chamber. In the painting operation illustrated the oven chamber 22 may be securely sealed in order to minimize fuel consumption. Conventional conveyor systems do not enable the oven doors to be completely closed and therefore fuel consumption is relatively higher.

It will also be apparent that any type closable chamber can be used in association with such a conveyor system. For example the ambient conditions within the chamber may be altered relative to the first position 24 in many known manners, such as an increase or decrease in pressure, humidity, complete or partial liquid immersion and exposure to gases for example may be accomplished in addition to the oven application as illustrated. Since the altered conditions within the enclosed chamber may be harmful to drive units 8 preferably the pinions 9 are mounted to laterally extended shafts which pierce through the outward walls of the closed chamber or oven 22. The drive motors are mounted outward of the oven chamber 22 where conditions are more favourable.

After oven curing is complete, the shuttle beams 2 may be transferred again to the right and thereafter transferred to the transverse crane 15 to be further assembled or unloaded on pallets 20.

The wheels or roller bearings 6 and 7 to be provided in the portion 25 of the track 1 within the oven are preferably formed of metal to be heat resistant. The absence of wheels on the shuttle beams 2 enables less expensive plastic wheels on roller bearings 6 and 7 to be used on other tracks 1 than those in the oven. It will be understood that the invention includes embodiments in which rollers are attached to the shuttle beams 2 and not the track 1 which is advantageous in certain circumstances.

Although the conveyor system illustrated and application as explained above appears relatively simple, significant advantages are obtained over conventional systems. Each operation may be conducted completely independently of others. For example loading of shuttle beams 2, painting, and oven curing may be operated completely independently. Materials may be stockpiled in advance or stored in a buffer zone afterwards. Optimization of speeds of any operation may be conducted independently of all other operations. Significantly increased control over the speed, acceleration and deceleration of items being conveyed is obtained. Impact between conveyed items may be eliminated or substantially reduced.

The use of conventional continuous conveyors in oven applications creates a significant heat sink, since the continuous conveyor chain extracts heat from the oven. In contrast the use of discrete shuttle beams 2, which may be inserted individually inside a closed oven chamber, substantially reduces the heat loss from such heat sinks and in addition completely seals the oven reducing heat loss through openings adjacent to the conventionally used continuous chain.

The gap between adjacent track modules 1 also serves to enable transfer cranes 15 or rotary turn tables to be used in order to transfer shuttle beams 2 between various lines of conveyors. In general terms such transfer means may be characterized as follows. A first and a third portion of track are spaced apart from each other and are fixed in position and a second portion of track is mounted on a transfer platform and the transfer platform is reciprocally movable between longitudinal alignment with the first and the third portions. In the embodiment illustrated, the third track portions are disposed parallel to an transversely spaced from the first track portions. When a rotary turntable is used, the third track portion is disposed at an angle to the first track portion and is radially spaced from a point of intersection of the longitudinal axis of the first and third track portions. The transfer platform which supports the second track portion comprises a rotary turn table concentric that point. Of course other transfer means may be applied to equal advantage, such as elevators, ramps, etc.

The use of such transfer platforms enables bi-passing of certain production steps if required. Transfer platforms also allow the stockpiling of the output by enabling a single output conveyor to feed a number of downstream conveyor lines. The ability to transfer rotationally, transversely and/or vertically in an elevator enables the conveyor system to turn corners or otherwise match the layout of existing facilities without requiring extensive modifications.

In particular when such a conveyor system is used for electrostatic powder painting the grounding of objects to be painted may be controlled and/or accurately monitored resulting in superior quality and reduced rework. In a preferred embodiment the roller bearings 6 and 7 are plastic and the shuttle beams 2 and tracks 1 are extruded aluminum. The bearings 6 and 7 are arranged in the middle track within a paint booth 17 such that they electrically isolate the beam 2 from the track 1.

The pinion 9 is electrically conductive, constructed of metal for example. The pinion contacts the rack 7 to electrically ground the beam 2. The pinion 9 is electrically isolated from the track 1 and is connected to ground via a single conduit path. The ground conduit path preferably includes a meter provided therein to measure current flow (ampmeter) and/or relative potential (voltmeter).

To ensure consistent quality of painting, the meter may be monitored. For example during normal powder coating, the electrostatically charged powder particles should conduct a positive charge to the grounded metal article being coated. As a result, current will flow from the article via the beam and pinion and hence through the meter 30 to ground. If the meter 30 does not sense current flow, this could indicate an improper ground. Automatic monitoring of the meter could include the stimulation of a warning alarm and may transmit a signal to cease the powder spraying operation.

Having a single conduit path from the beam 2 to the ground is therefore advantageous for quality control and/or monitoring. The provision of a single ground is also advantageous from the point of view of safety. Construction of the motor units for use in the paint booths so as to provide a single grounding path for the pinion can be arranged by a number of different constructions, for example by isolating the pinion for rotation in bearings which do not conduct electrically and by driving the metal pinion with a non-conductive drive gear. A single ground connection is preferably maintained at all times between items to be painted which are hung in a conventional manner on the shuttle beams 2 via the metallic pinion 9 to conventional grounding means.

The movable paint booths preferably utilize as their electrostatic spray equipment tribo-charging guns in which, as is known, charge the powder particles in the gun as by friction in the powder particles passing under pressure through the gun. While such tribo-charging guns are more difficult to clean than corona-charging guns, this is not a disadvantage with each gun dedicated to a specific colour booth. Tribo-charging guns avoid the disadvantages inherent in corona guns including the need for a high voltage generator.

The invention in its preferred embodiments comprises at least in part a conveying system as shown in FIGS. 6 and 7 in which each successive track module 1 is spaced so that a beam 2 may be passed between modules 1 by the pinion 9 from one of the track modules 1 always engaging the beam 2. It is to be appreciated however that this is not a necessary arrangement for all movement of the beams 2. Embodiments contemplated within the scope of the invention include other methods for moving beams such as using one beam 2 to push adjacent beams 2 forwardly or rearwardly.

Figure 12:
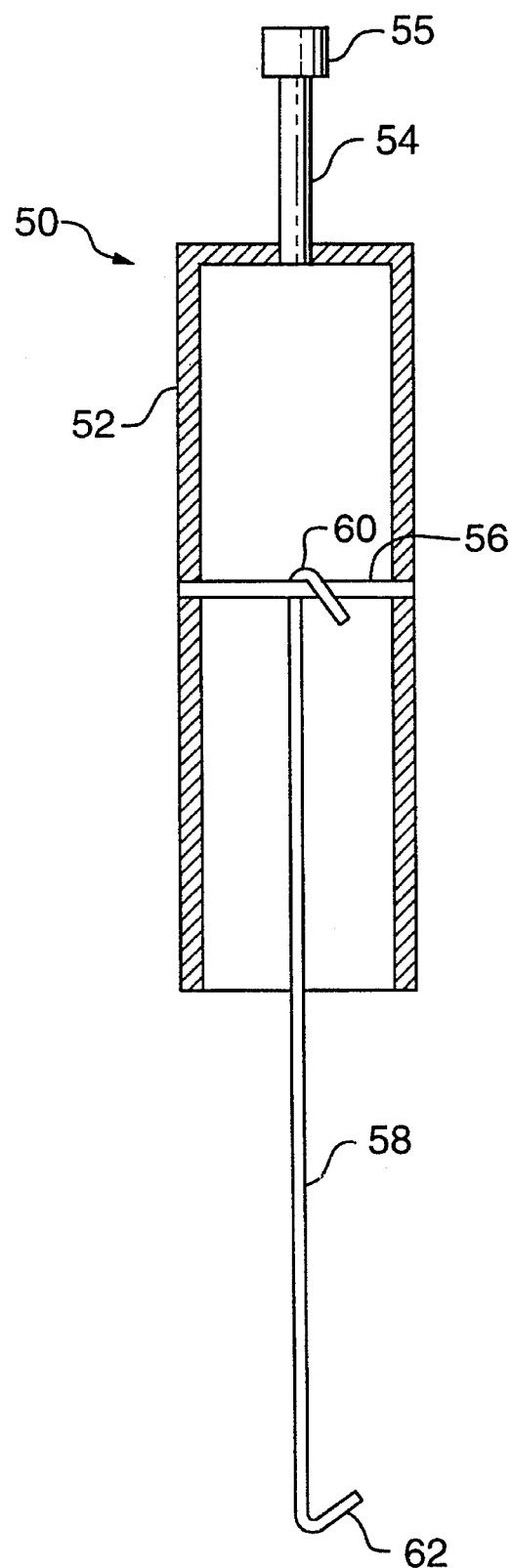
FIGS. 12 and 13 show two preferred hanger assemblies for hanging articles to be electrostatically powder coated from beams in accordance with the present invention.

FIG. 12 shows a hanger assembly 50 preferably formed completely from metal, more preferably aluminum. The assembly 50 comprises a cylindrical powder shield tube 52 closed at its upper end where the tube 52 is connected to an elongate hanging rod 54 having an enlarged end 55 sized to be received between the webs 4 of a beam 2 permitting the hanger assembly to be removably hung from the beam 2. The lower end of the tube 52 is open. A support rod 56 extends across the inside of the tube 52 and is adapted for engagement by an upper hooked end 60 of a removable hanging wire 58 having a lower hooked end 62 upon which an article to be painted is to be hung.

The hanger assembly 50 is useful in electrostatic powder coating operations. In such powder painting, the charged powder will have a tendency to coat the outer surfaces of the shield tube 52. In repeated use in powder coating operations layers of powder will come to be coated on and dried on the outer surfaces of the shield tube with considerably less powder coated on the inner surfaces of the tube or on the hanging wire 58 inside the tube. The tube 50 can readily be removed and have powder coated and dried on its exterior surface removed periodically. Preferably the tube 52 may have powder removed by placing the tube in a lathe and turning down the tube to its original outer diameter. The removed powder may be recycled as by grinding and use in black coloured powder paint. The tube 52 is preferably of aluminum metal and serves to provide good electrical connection and grounding from an article suspended on hanging wire 58 and beam 2.

Figure 13:
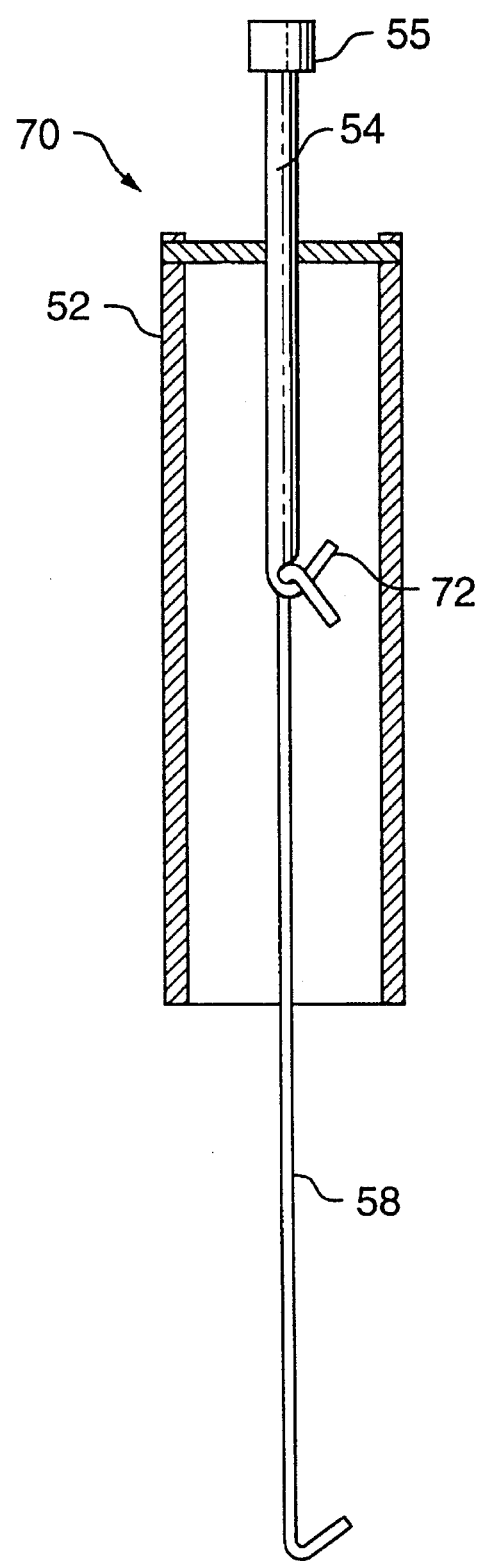

FIG. 13 shows a hanger assembly 70 substantially the same as in FIG. 12 but with the tube 52 being made from heat resistant cardboard or plastic. The support rod 56 is made from metal and extends down inside the tube providing a lower hook end 72 to be engaged by the hanging wire 58. The tubes 52 of cardboard or plastic could be disposed after use.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A conveyor for conveying items along a longitudinal track, said conveyor comprising:

at least one shuttle means engaged on said track for longitudinal movement therealong, each shuttle means including longitudinal tooth rack means with engagement means, drive means along the track for engaging and propelling each shuttle means, the drive means comprising pinion gear means complementary to the rack means for synchronized movement of the pinion gear means and the rack means by engagement between the engagement means of the rack means and teeth means of the pinion gear means when the engagement means of the rack means is disposed along a desired path relative the pinion gear and located on the path in phase with the teeth means, the rack means having a flexible end portion at at least one end of the rack means capable of being deflected from a normal position to a deflected position in which the engagement means are displaced from the path away from the pinion gear when engaged by teeth of the pinion gear means to assist in preventing jamming of the rack means and the pinion gear means when the teeth of the pinion gear means and the engagement means are not in phase along the path, the flexible end portion resiliently deflectable from the normal position to the deflected position and being biased to the normal position, one said flexible end potion provided as a forwardmost portion on a forward end of the rack means, and cantilevered spring means coupled to the shuttle means rearward of the forwardmost portion and extending forwardly towards the forward end to resiliently support the forwardmost portion in the normal position and biasing it to the normal position.

2. A conveyor as claimed in claim 1 wherein the rack means comprises link chain means.

3. A conveyor as claimed in claim 1 wherein another said flexible end portion is provided as a rearwardmost portion on a rear end of the rack means with a fixed central portion of the rack means disposed between the forwardmost portion and the rearwardmost portion.

4. A conveyor as claimed in claim 2 wherein the drive means comprises a first pinion gear and an adjacent second pinion gear longitudinally spaced along the track from the first pinion gear a distance less than or equal to the length of the rack means wherein on the rack means being engaged and advanced by a first of the pinion gear means towards the second pinion gear means, the forwardmost portion of the rack means becomes engaged with the second pinion gear means before the rearwardmost portion of the rack means disengages with the first pinion gear means and neither of the first or second pinion gear means engages the central portion of the rack means while the other pinion gear means engages any part of the rack means.

5. A conveyor as claimed in claim 1 wherein the drive means comprises at least a first pinion gear means and in adjacent second pinion gear means longitudinally spaced apart a second distance less than or equal to the first link wherein the rack means on being engaged and advanced by a first of the pinion gear means towards the second of the pinion gear means, the forwardmost portion of the rack becomes engaged with the second pinion gear before the rack disengages from the first pinion gear, and the first pinion gear means disengages from the rack means before the second pinion gear means engages the rack means rearward of the forwardmost portion.

6. A conveyor as claimed in claim 5 including a plurality of drive units each comprising a drive means with a pinion gear longitudinally spaced apart from adjacent drive means along said track.

7. A conveyor according to claim 1 wherein said shuttle means includes a longitudinally extending groove open at the side thereof facing said pinion gear and said link chain means disposed within the groove.

8. A conveyor as claimed in claim 1 wherein said link chain means comprises a plurality of link means pivotally connected to each adjacent link means by a pin means disposed perpendicular to said longitudinal and parallel and axis about which the pinion gear rotates.

9. A conveyor as claimed in claim 8 wherein said pin means comprise the engagement means.

10. A conveyor as claimed in claim 5 wherein said drive means comprises a integral unit carrying said mating pinion and drive motor, the drive means being releasably secured to the track by quick release means permitting the drive means to easily be removed for replacement and permitting the drive means to be secured to the track either in a rack engaging position in which the pinion coacts with the rack or a rack disengaging position in which the pinion does not coact with the rack and the shuttle beams may freely pass through the track.

11. A conveyor for conveying items along a longitudinal track, said conveyor comprising:

at least one shuttle means engaged on said track for longitudinal movement therealong, each shuttle means including longitudinal tooth rack means with engagement means, drive means along the track for engaging and propelling each shuttle means, the drive means comprising pinion gear means complementary to the rack means for synchronized movement of the pinion gear means and the rack means by engagement between the engagement means of the rack means and teeth means of the pinion gear means when the engagement means of the rack means is disposed along a desired path relative the pinion gear and located on the path in phase with the teeth means, the rack means having a flexible end portion at at least one end of the rack means capable of being deflected from a normal position to a deflected position in which the engagement means are displaced from the path away from the pinion gear when engaged by teeth of the pinion gear means to assist in preventing jamming of the rack means and the pinion gear means when the teeth of the pinion gear means and the engagement means are not in phase along the path, the flexible end portion resiliently deflectable from the normal position to the deflected position and is biased to the normal position, one said flexible end portion provided as a rearwardmost portion on a rearward end of the rack means, and cantilevered spring means coupled to the shuttle means forward of the rearwardmost portion and extending forwardly towards the rearward end to resiliently support the rearwardmost portion in the normal position and biasing it to the normal position.

12. A conveyor as claimed in claim 11 wherein the rack means comprises link chain means.

13. A conveyor as claimed in claim 11 wherein another said flexible end portion is provided as a forwardmost portion on a forward end of the rack means with a fixed central portion of the rack means disposed between the forwardmost portion and the rearwardmost portion.

14. A conveyor as claimed in claim 12 wherein the drive means comprises a first pinion gear and an adjacent second pinion gear longitudinally spaced along the track from the first pinion gear a distance less than or equal to the length of the rack means wherein on the rack means being engaged and advanced by a first of the pinion gear means towards the second pinion gear means, the forwardmost portion of the rack means becomes engaged with the second pinion gear means before the rearwardmost portion of the rack means disengages with the first pinion gear means and neither of the first or second pinion gear means engages the central portion of the rack means while the other pinion gear means engages any part of the rack means.

15. A conveyor comprising, in combination:

a longitudinally extending shuffle;

a longitudinally extending track for supporting said shuttle as it is being conveyed along the tracks;

a plurality of rotary drive means longitudinally spaced along said track for engaging and moving said shuttle along said track, each of said plurality of rotary drive means including a driven pinion which engages a longitudinally extending rack on said shuttle;

wherein said drive means are spaced from each other a distance so that a downstream drive means engages said shuttle before an upstream drive means disengages said shuttle; and wherein said rack is coupled to said shuttle so that as the pinion of said downstream rotary drive means engages said rack while said shuttle is being engaged by said upstream rotary drive means, an end portion of the rack can be displaced relative the shuttle to accommodate the engagement;

said end portion of the rack being capable of being deflected from a normal position in which the end portion engages the pinion to a deflected position in which the end portion of the rack is displaced away from the pinion, cantilevered spring means coupled to the shuttle and extending longitudinally towards said one end, the cantilevered spring means resiliently supporting the end portion in the normal position and biasing it to the normal position from the deflected position.

* * * * *